(No Model.)

A. NEUHAUSEN.
MANUFACTURE OF CANDIES, &c.

No. 271,259. Patented Jan. 30, 1883.

WITNESSES:
C. Neveux
C. Sedgwick

INVENTOR:
A. Neuhausen
BY Munn & Co
ATTORNEYS.

UNITED STATES PATENT OFFICE.

AUGUST NEUHAUSEN, OF CHICAGO, ILLINOIS.

MANUFACTURE OF CANDIES, &c.

SPECIFICATION forming part of Letters Patent No. 271,259, dated January 30, 1883.

Application filed July 1, 1882. (No model.)

*To all whom it may concern:*

Be it known that I, AUGUST NEUHAUSEN, of Chicago, Cook county, Illinois, have invented a new and useful Improvement in the Manufacture of Candies and Crystallizing Confections, of which the following is a full, clear, and exact description.

Reference is to be had to the accompanying drawings, forming part of this specification, in which similar letters of reference indicate corresponding parts in both figures.

Figure 1:
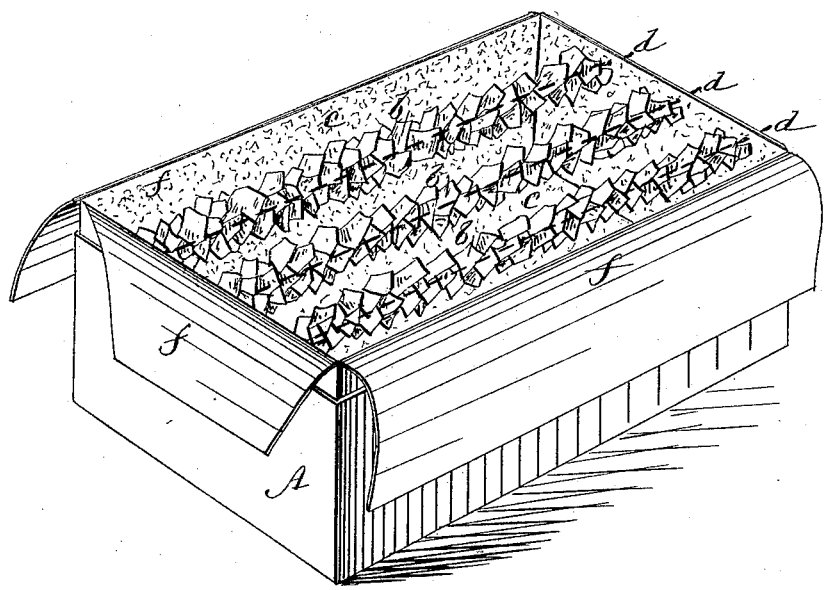
Figure 2:
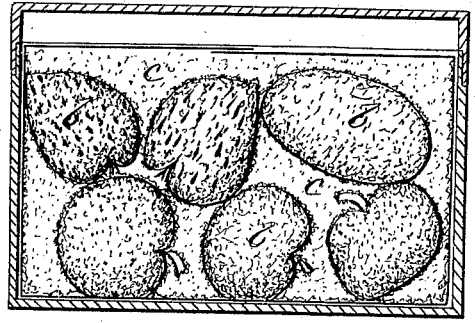

Figure 1 represents a perspective view of a box of rock-candy put up in accordance with my invention, and Fig. 2 a vertical section of a box of fruit-candies in further illustration of the invention.

This invention relates to the manufacture of rock-candy and crystallizing various other candies, fruits, and substances known as "confections."

The method heretofore and at present practiced of crystallizing candies and confections of various kinds is as follows: The candies or confections to be crystallized are put into large tin pans or vessels, sugar is boiled into sirup of a certain consistency, and when slightly cooled poured over said candies or confections and allowed to stand for about twenty hours, after which the sirup is run off, leaving on the candies or confections a thin coat of glistening, sparkling sugar, which is the crystal. After giving this crystal a few hours' time to dry, the candy or confection is finished, and is taken out of the large tin pans or vessels in which it was crystallized and packed in divided-up quantities, usually of five or ten pounds weight, within paper boxes, for shipment to store-keepers, which boxes form the commercial packages of the trade.

In the above ordinary method of proceeding the brilliant appearance of the crystals is greatly impaired by reason of the handling of the crystallized articles or substances in removing them from the tin vessels to the paper boxes. My invention not only obviates this, but also the intermediate handling of them which is customary, consequent on the placing of them on boards to dry after taking them out of the crystallizing-pans, and the subsequent weighing of them before packing them away in the paper boxes. I also dispense with the crystallizing-pans, make a better crystallized candy or confection in less time, and save considerable expense.

To these and other ends my invention consists in crystallizing the candies or confections direct in the boxes, which hold a given weight, and which constitute the packages of commerce; and the invention furthermore consists in a package of candies or confections so crystallized as a new article of manufacture. The method of crystallizing is or may be the same as is already practiced in the pans, and after the surplus sirup has been allowed to run off and the candies or confections slightly dried in the boxes in which they have been crystallized said boxes are or may be shipped directly to customers.

To particularize the advantages which are incidental to this method of putting up candies and confections, it may be observed—

First. That all such goods thus put up look brighter, nicer, and are of course cleaner, as no hand other than the consumer's touches the goods after they have been crystallized, the manufacturers sending the original boxes to the jobbers, the jobbers to the store-keepers, and the store-keepers retailing the candies in the box to the customer.

Second. The manufacturer saves the time that heretofore was consumed in washing out and cleaning the crystallizing-pans after each use of them—that is, before putting in a new lot of goods. He also saves the time used in taking the crystallized goods out of the pans and putting them on boards to dry, and in packing them in boxes for the trade.

Third. Candies and confections in the boxes they are sold in will not mash or break so readily, thereby enabling the store-keeper to make a better show.

Fourth. The goods may be made softer, thus increasing the profits of the manufacturer and enabling the retailer to sell more, as soft candies keep longer fresh.

Fifth. In using crystallizing-pans as heretofore the boiled or prepared sugar or sirup has, for certain descriptions of candies, been run into impressions made from plaster-of-paris molds, in starch, and after cooling off such candies have had to be sifted out of the starch, which not only takes up a great deal of time, but is a very dirty and unpleasant operation. My improvement does away with this for a great many articles, inasmuch as I run the sirup or other prepared mixture direct into small boxes, which may have any desired shape given them, or be embossed or ornamented with the desired designs.

Sixth. There is no waste of sugar and starch, and the expense of molds and starch-boards is avoided.

Seventh. By my improved method the manufacturer is enabled to crystallize even such soft fruits as cannot be laid in pans collectively without injury, but may readily be arranged separate in a small sale-box.

In Fig. 2 of the drawings, $b\ b$ represent a collection of fruit-candies; or other articles or substances may be substituted for the fruit, and the confections be variously arranged within the box A, in which said candies or confections are crystallized, as hereinbefore described, $c$ representing the crystallizing material. This box A may be made of paper or any other suitable material, and of any desired size and shape, and be constructed to open either with a slip-lid or otherwise; but in every instance it is not only the vessel in which the crystallization is effected, but also the box or package of candies or confections, which is sold to the customer or consumer.

In the manufacture of rock-candy, which is the main article produced by crystallization, it has heretofore been customary to take metal crystallizing-vessels, of one foot or more in every direction, and arrange strings of linen thread across them, in order that the boiled sugar may form a body around said strings. The sugar is boiled somewhat thicker than the sirup, which is afterward poured into these vessels. After standing in a hot room for some days the surplus sirup is run off, leaving the crystallized rock-candy, which in the meantime had formed on the strings. The candy is then allowed to remain another day (more or less) to dry, after which it is broken out of the crystallizing-vessels, and that which adheres to the strings is regarded as of superior quality and sold as string rock-candy, while the remaining portions adhering to the bottom and sides of the vessel are broken and mashed at the cost of much labor, and partly sold at a cheaper rate than the string rock-candy, and partly— that is, the fine stuff—passed to the melting-kettle to be used for other kinds of candies. By my improved method, however, I proceed as hereinbefore stated for making other candies or confections. Thus I run the boiled sugar directly into the boxes in which the goods are afterward sold, and allow the heavy crystals to form around strings extended across said boxes, which may be made of paper, pasteboard, wood, tin, or any other suitable material, and constitute the packages of commerce as retailed by the store-keeper.

The advantages of this mode of proceeding are: first, the rock-candy so made or put up leaves no scrap, which is a great saving; second, it can be made of different colors in the same box by means of a partition within the box; third, the product is all sold as first quality, because the portion adhering to the bottom and sides is not broken out; fourth, it shows all interested, including the consumer, the whole structure and how the candy was made; fifth, it saves the manufacturer a large amount of time, and it saves considerable time and wrapping-paper to every retailer, for the reason that the candy is already packed in neat small boxes of salable size for different consumers.

To prevent the crystals settling thick or heavy on the bottom and sides of the box, said box is lined with waxed paper or other poor adhesive material.

In Fig. 1 of the drawings, A represents a box of merchantable size suitable for retailing purposes, and $b\ b$ the rock-candy formed therein on strings $d\ d$, extending across the box. $c\ c$ are the crystals adhering to the interior surfaces of the box, and $f\ f$ the waxed paper with which said box is lined to prevent the crystals from setting thick or heavy on the interior of the box.

Having thus described my invention, I claim as new and desire to secure by Letters Patent—

1. In manufacturing rock-candy and crystallizing other candies and confections, directly crystallizing the same within the boxes in which said goods are supplied to the retailer and bought by the consumer, substantially as and for the purposes herein set forth.

2. As a new article of manufacture, a retail-box of candies or confections crystallized within the box and forming a commercial package of crystallized candies or confections, essentially as herein described.

3. A box of candies or confections crystallized within it, lined with waxed paper or imperfect adhesive material for the crystals forming on the interior surfaces of the box, substantially as specified.

AUGUST NEUHAUSEN.

Witnesses:
PETER MILLER,
THEODORE SCHINTZ.